(12) United States Patent
Lee et al.

(10) Patent No.: US 12,589,880 B2
(45) Date of Patent: Mar. 31, 2026

(54) ROTOR, AND PROPELLER DRIVING DEVICE AND AIRCRAFT USING THE SAME

(71) Applicant: AMOTECH CO., LTD., Incheon (KR)

(72) Inventors: Jeong Hoon Lee, Incheon (KR); Seung Jin Choi, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 295 days.

(21) Appl. No.: 18/286,662

(22) PCT Filed: Apr. 20, 2022

(86) PCT No.: PCT/KR2022/005647
§ 371 (c)(1),
(2) Date: Oct. 12, 2023

(87) PCT Pub. No.: WO2022/225324
PCT Pub. Date: Oct. 27, 2022

(65) Prior Publication Data
US 2024/0204617 A1 Jun. 20, 2024

(30) Foreign Application Priority Data

Apr. 23, 2021 (KR) ........................ 10-2021-0052897
Apr. 23, 2021 (KR) ........................ 10-2021-0052898

(51) Int. Cl.
B64D 33/08 (2006.01)
B64D 27/30 (2024.01)
(Continued)

(52) U.S. Cl.
CPC ............. B64D 33/08 (2013.01); B64D 27/30 (2024.01); B64D 27/32 (2024.01); B64D 27/34 (2024.01);
(Continued)

(58) Field of Classification Search
CPC .......... H02K 9/223; H02K 9/22; H02K 1/278; H02K 1/2781; H02K 1/2783; H02K 1/274;
(Continued)

(56) References Cited

U.S. PATENT DOCUMENTS 6,234,767 B1 * 5/2001 Takeda ..................... H02K 9/06
417/366
7,911,091 B2 * 3/2011 Takenaka ............... H02K 9/197
310/58
(Continued)

FOREIGN PATENT DOCUMENTS

JP 2002191149 A * 7/2002 ............... H02K 3/24
JP 2019147498 A 9/2019
(Continued)

OTHER PUBLICATIONS

JP-2002191149-A Translation (Year: 2002).*
International Search Report—PCT/KR2022/005647 dated Aug. 9, 2022.

*Primary Examiner* — Oluseye Iwarere
*Assistant Examiner* — Nicholas Lee Setzer
(74) *Attorney, Agent, or Firm* — CANTOR COLBURN LLP

(57) ABSTRACT

Provided are a rotor, and a propeller driving device and an aircraft using same. The propeller driving device includes: a housing in which an upper cover and a lower cover having a plurality of through holes are respectively coupled to an upper portion and a lower portion of a cylindrical case; a stator arranged inside the case; a rotor arranged at a distance from the stator; and a rotary shaft connected to the rotor through a plurality of bridges and having both ends rotatably supported by an upper bearing and a lower bearing positioned at respective centers of the upper cover and the lower cover, wherein inner cooling of a motor is formed by an air (Continued)

10 flow passage that passes through a plurality of through holes of the upper cover and the lower cover and a plurality of spaces formed between the plurality of bridges.

8 Claims, 7 Drawing Sheets

(51) Int. Cl.

| | |
|---|---|
| *B64D 27/32* | (2024.01) |
| *B64D 27/34* | (2024.01) |
| *H02K 1/278* | (2022.01) |
| *H02K 1/28* | (2006.01) |
| *H02K 5/20* | (2006.01) |
| *H02K 7/08* | (2006.01) |
| *H02K 9/06* | (2006.01) |
| *H02K 9/19* | (2006.01) |
| *H02K 9/22* | (2006.01) |
| *H02K 21/16* | (2006.01) |

(52) U.S. Cl.
CPC .............. *H02K 1/278* (2013.01); *H02K 1/28* (2013.01); *H02K 5/203* (2021.01); *H02K 5/207* (2021.01); *H02K 7/083* (2013.01); *H02K 9/06* (2013.01); *H02K 9/19* (2013.01); *H02K 9/223* (2021.01); *H02K 21/16* (2013.01)

(58) Field of Classification Search
CPC   H02K 5/20; H02K 5/207; H02K 9/02; H02K 9/04

See application file for complete search history.

(56) References Cited

U.S. PATENT DOCUMENTS

| | | | |
|---|---|---|---|
| 2014/0158816 A1* | 6/2014 | DeLorean ............ | B64D 27/355 244/12.4 |
| 2016/0197535 A1* | 7/2016 | De Filippis ............ | H02K 1/276 310/43 |
| 2020/0328657 A1* | 10/2020 | Jung ...................... | H02K 11/21 |
| 2021/0067003 A1* | 3/2021 | Ha ........................... | H02K 1/32 |

FOREIGN PATENT DOCUMENTS

| | | |
|---|---|---|
| KR | 20170090037 A | 8/2017 |
| KR | 20190014743 A | 2/2019 |
| KR | 20200120258 A | 10/2020 |

* cited by examiner

ROTOR, AND PROPELLER DRIVING DEVICE AND AIRCRAFT USING THE SAME

TECHNICAL FIELD

The present invention relates to a propeller driving device and an aircraft using same, and more specifically, to a rotor, and a propeller driving device and an aircraft using same, the rotor enabling effective heat dissipation in a water-cooling manner by using a water jacket having a refrigerant circulation circuit while realizing inner air cooling by using an air flow passage formed inside a motor.

BACKGROUND ART

Typically, a brushless electric motor used for an aircraft includes: a case including a stator to which a battery is connected; and a rotor, wherein a propeller is mounted on the case.

In this case, since the case serves as a rotor in the electric motor for an aircraft, the case itself rotates to rotate the propeller, thereby generating the propulsion force of the aircraft.

In addition, since the case itself rotates in the electric motor for an aircraft, thereby generating high torque. In addition, a large propeller may be directly turned without a reducer, and the electric motor may be lightened since an accessory such as a reducer is not required.

However, in the electric motor for an aircraft, since the case itself rotates as a rotor, a lot of heat is generated from the stator arranged inside the case. In this case, the electric motor is cooled by the flow of air when the speed of the aircraft is fast, but there is almost no air flow in a helicopter that mainly performs a stop flight, and thus the electric motor for the helicopter needs to be cooled since the electric motor is overheated.

To this end, in the electric motor used for an aircraft, an upper plate of the case is typically perforated, or a plurality of cooling holes formed in the case by being cut in a predetermined area are provided. Therefore, when the electric motor is driven, air flows into the cooling holes of the case through the air flow caused by the rotation of the propeller, thereby cooling the electric motor.

However, when the electric motor is driven and the case rotates at a constant speed, rain, moisture, and other foreign substances are not likely to enter the case by the rotational force of the case, but if the aircraft is stopped and parked outside, foreign substances such as rainwater, moisture, or dust may enter the case through the cooling hole of the case.

Foreign substances such as rainwater, moisture, or dust introduced in this way may cause electrical short circuits or fires due to short circuits.

Therefore, in order to solve this problem, measures of covering the electric motor with a tarp such as vinyl were previously taken, but these measures are temporary and cumbersome, so they are not a fundamental solution to the problem.

Korean Patent Application Publication No. 10-2017-0090037 (Patent Document 1) discloses a power transmission device for an aircraft having functions of preventing moisture penetration and preventing overheating, which is capable of effectively implementing a cooling function of an electric motor, by introducing an opening and closing control means that may open and close cooling holes of the case formed to cool the electric motor, thereby preventing moisture or foreign substances from entering the electric motor by automatically closing the cooling holes of the case when the aircraft is stopped, as well as enabling the opening and closing control means to adjust the opening amount of the cooling holes of the case according to the rotational force of the case when the aircraft operates, to thus effectively implement the cooling function of the electric motor.

In general, the electric motor generates more heat in a stator in which a motor driving current is applied to a coil than a rotor, and when the heat generated in this way is not discharged to the outside of the electric motor, the heat may act as a factor of lowering the efficiency and lifespan of the motor.

The electric motor of Patent Document 1 has a structure in which the stator is located in a central portion in an outer rotor scheme. Patent Document 1 includes cooling holes through which air for air cooling is introduced into and discharged from a front surface and a rear surface of a cylindrical case serving as a rotor.

Patent Document 1 discloses a technology in which the opening/closing control means capable of opening and closing the cooling holes of the case formed to cool the electric motor is introduced, so that when the aircraft is stopped, the opening/closing control means automatically closes the cooling holes of the case so as to block moisture or foreign substances from flowing into the electric motor.

Meanwhile, an unmanned aerial vehicle (UAV), that is, a drone, is variously applied to various purposes such as surveillance/reconnaissance/search, disinfection/control/spray, broadcast/performance, environmental measurement, and lifesaving, including a logistics field for delivering parcel items.

Motors for propeller driving devices, especially BLDC motors, which are used in light aircraft for two people or large drones that carry high weight loads, require dozens of Kw-class driving motors. In this case, an outer rotor type motor (Patent Document 1) in which a stator having a coil wound around a core is arranged inside is limited in effectively cooling a lot of heat generated from the stator.

Heat generated from the stator and accumulated therein without being dissipated to the outside, may shorten an operation life and reduce operation efficiency. In order to prevent this, a heat dissipation member or a heat dissipation device such as a heat sink or a heat exchanger is used together with a heating device.

Accordingly, a heat dissipation member manufactured using injection molding or extrudable polymer resin has recently been proposed, and many studies have continued based on the advantages of lightweight and low cost due to the material properties of the polymer resin itself.

However, a heat dissipation member manufactured by using a polymer resin expresses heat dissipation performance through a thermally conductive filler, and typically, a thermally conductive filler having excellent heat dissipation performance exhibits together electrical conductivity. Accordingly, the thus-implemented heat dissipation member expresses the electrical conductivity, thereby causing a problem of being very inadequate to be used in an electronic device requiring insulation.

In particular, in the case of an aviation motor, it is required to have insulation performance to avoid lightning.

In addition, AC motors are not suitable for aviation motors because they have a larger volume and weight than BLDC motors.

DISCLOSURE

Technical Problem

The inventors of this invention simultaneously have not realized only inner air cooling by forming a plurality of through holes between upper and lower covers and a plurality of bridges connecting a rotor body with a rotary shaft, but also have realized natural outer air cooling through a side casing while placing a stator that generates more heat than a rotor outside, and have discovered that problems in which foreign substances such as moisture or the like enter the motor due to the inner air cooling to accordingly cause an electrical short or fire may be prevented by separating and blocking the stator by insert molding using an insulating heat dissipation composite material, thereby preventing the occurrence of the electrical short or fire.

Therefore, an objective of the present invention is to solve the problems of the prior art. The objective of the present invention is to provide a propeller driving device capable of effectively cooling a rotor and a stator by outer air cooling and inner air cooling by using an inner rotor-outer stator type BLDC motor, and an aircraft using same.

Another objective of the present invention is to provide a rotor, and a propeller driving device and an aircraft using same, wherein the rotor may be effectively cooled by inner air cooling by forming a plurality of through holes in upper and lower covers and simultaneously forming a plurality of through holes by connecting a rotor body with a rotary shaft through a plurality of bridges.

Another objective of the present invention is to provide a rotor and a propeller driving device using same, the rotor having a plurality of through holes formed by connecting a rotor body with a rotary shaft through a plurality of bridges so as to achieve an inner air cooling together with a plurality of through holes formed in upper and lower covers.

Another objective of the present invention is to provide a propeller driving device capable of effective heat dissipation in a water-cooling manner by having a water jacket having a refrigerant circulation circuit capable of circulating a refrigerant between an outer circumferential portion of a stator core and a casing.

Another objective of the present invention is to provide a propeller driving device using a stator having an excellent heat dissipation effect by forming an insulator (or a bobbin) insulating spaces between a stator core and a coil with an insulating heat dissipation composite material having both heat dissipation performance and insulation performance.

Another objective of the present invention is to provide a propeller driving device using a stator capable of solving a problem in which moisture or foreign substances are introduced into a motor according to inner air cooling to thereby cause an electrical short or fire, together with a heat dissipation effect by insert-molding an insulating heat dissipation composite material having both heat dissipation performance and insulation performance so as to insulate spaces between wound coils while surrounding the coil wound around an insulator (or bobbin) of the stator.

Another objective of the present invention is to provide a propeller driving device using a stator, which maximizes heat dissipation performance by varying compositions of a first insulating heat dissipation composite material used to form an insulator (or bobbin) insulating spaces between a stator core and a coil, and a second insulating heat dissipation composite material coated by an insert molding method so as to insulate spaces between the coils while surrounding the coil wound around the insulator (or bobbin).

Technical Solution

According to an embodiment of the present invention, there is provided a rotor for a propeller driving device including: a hollow rotary shaft; a plurality of bridges extending radially from the rotary shaft; an annular rim connected to a front end of each of the bridges; an annular back yoke installed outside the rim to form a path of a magnetic circuit; and a plurality of magnets which are installed on the outside of the back yoke and rotate according to a rotating magnetic field of the stator, wherein a plurality of spaces formed between the plurality of bridges form an air flow passage through a motor.

The rotor for the propeller driving device according to the present invention further includes a rotor support covering an outer surface except for an outer surface of each magnet facing a shoe portion of a stator core, wherein the rotor support may include: an annular upper plate and an annular lower plate which cover upper and lower portions of each of the magnets; and a plurality of connection units which are arranged between the magnet and the magnet and have both ends connected to the upper plate and the lower plate.

In addition, the rotor further includes a plurality of blades installed on the upper and lower plates of the rotor support to generate circumferential wind when the rotor rotates, wherein the circumferential wind may collide with an air flow for air cooling passing through the motor to generate a vortex.

According to an embodiment of the present invention, there is provided a propeller driving device including: a housing in which an upper cover and a lower cover having a plurality of through holes are respectively coupled to an upper portion and a lower portion of a cylindrical case; a stator arranged inside the case; a rotor arranged at a distance from the stator; and a rotary shaft connected to the rotor through a plurality of bridges and having both ends rotatably supported by an upper bearing and a lower bearing positioned at respective centers of the upper cover and the lower cover, wherein inner cooling of a motor is formed by an air flow passage that passes through a plurality of through holes of the upper cover and the lower cover and a plurality of spaces formed between the plurality of bridges.

In this case, the rotor may include: a hollow rotary shaft of which both ends are rotatably supported by the upper bearing and the lower bearing positioned at the center of the upper cover and the lower cover; a plurality of bridges extending radially from the rotary shaft; an annular rim connected to a front end of each of the plurality of bridges; an annular back yoke installed outside the rim to form a path of a magnetic circuit; and a plurality of magnets which are installed on the outside of the back yoke and rotate according to a rotating magnetic field of the stator.

According to the present invention, the propeller driving device further includes a plurality of blades installed on an upper portion and a lower portion of the rotor to generate circumferential wind when the rotor rotates, wherein the circumferential wind may collide with an air flow of the air flow passage passing through the motor to generate a vortex.

In addition, the propeller driving device according to the present invention may further include a water jacket arranged between the cylindrical case and the stator and having a spiral refrigerant circulation circuit capable of circulating a refrigerant between the cylindrical case and the stator.

Moreover, the propeller driving device according to the present invention may further include a propeller installation bracket for mounting a propeller on the rotary shaft.

The propeller installation bracket has a ring shape with a central through hole formed in the central portion, the central through hole has an annular protrusion portion arranged on the lower side to be coupled to the rotary shaft of the motor, and an upper end portion of the rotary shaft and a bottom surface of the protrusion portion surface-bonded by receiving the upper end portion may be coupled in a step structure in order to catch torsion during the rotation of the propeller.

The stator includes: a stator core having an annular back yoke having a predetermined width so as to form a magnetic circuit and a plurality of teeth extending from the back yoke in a central direction; an insulator formed to surround an outer circumferential surface on which a coil is wound in each of the plurality of teeth; and a stator coil wound around an outer circumferential surface of the insulator in each of the plurality of teeth, wherein the insulator may be formed of an insulating heat dissipation composite material having both heat dissipation performance and insulation performance.

The stator further includes a stator support having heat dissipation characteristics while surrounding a stator coil wound on the insulator while insulating spaces between adjacent coils, wherein the stator support may be integrally formed by insert-molding an insulating heat dissipation composite material having heat dissipation performance and insulation performance.

The insulator includes an upper insulator and a lower insulator which surround, by ½, the outer circumferential surface on which a coil is wound in each of the teeth, and each of the upper and lower insulators may include: an annular base frame having a predetermined width; and a plurality of teeth receiving portions protruding from the base frame to receive, by ½, a winding area of each of the teeth from the upper and lower portions.

According to another embodiment of the present invention, there is provided a propeller driving device including: a radial gap type BLDC motor with an inner rotor-outer stator structure in which a rotor is placed in a circumferential shape with an air gap inside a stator; and a propeller installation bracket for mounting a propeller to a rotary shaft of the motor, wherein the motor includes a stator, a rotor, and a rotary shaft sequentially arranged inside a housing in which an upper cover and a lower cover are respectively coupled to upper and lower portions of a cylindrical case, and has an air flow passage passing through a plurality of through holes provided in the upper cover, a plurality of spaces formed between a plurality of bridges connecting the rotary shaft with the rotor, and a plurality of through holes provided in the lower cover in the axial direction of the motor.

The propeller driving device according to the present invention may further include a water jacket arranged between the cylindrical case and the stator and having a spiral refrigerant circulation circuit capable of circulating a refrigerant between the cylindrical case and the stator. According to another embodiment of the present invention, there is provided an aircraft including: a fuselage; a control box placed at a front end of the fuselage; and a propeller driving device which drives a propeller installed at a distance from a front surface of the control box; wherein the propeller driving device includes: a housing in which an upper cover and a lower cover having a plurality of through holes are respectively coupled to an upper portion and a lower portion of a cylindrical case; a stator arranged inside the case; a rotor arranged at a distance from the stator; and a rotary shaft connected to the rotor through a plurality of bridges and having both ends rotatably supported by an upper bearing and a lower bearing positioned at respective centers of the upper cover and the lower cover, wherein inner cooling of a motor is formed by an air flow passage that passes through a plurality of through holes of the upper cover and the lower cover and a plurality of spaces formed between the plurality of bridges.

Effects of the Invention

As described above, in the propeller driving device according to the present invention, an inner rotor-outer stator type BLDC motor is used, and the rotor and the stator may be effectively cooled by outer air cooling and inner air cooling.

In addition, in this invention, by forming a plurality of through holes in upper and lower covers and simultaneously connecting a rotor body with a rotary shaft through a plurality of bridges, effective cooling may be achieved by inner air cooling through the plurality of through holes.

Further, in the present invention, effective heat dissipation may be achieved in a water-cooling manner by having a water jacket having a refrigerant circulation circuit capable of circulating a refrigerant between an outer circumferential portion of a stator core and a casing.

In the present invention, an excellent heat dissipation effect may be obtained by forming an insulator (or a bobbin) insulating spaces between a stator core and a coil as an insulating heat dissipation composite material having both heat dissipation performance and insulation performance, to thereby achieve improvement of motor efficiency. Moreover, an insulator (or a bobbin) is formed of an insulating heat dissipation composite material, to thereby provide an aviation motor capable of assuring mechanical strength such as tensile strength, flexural modulus, and the like which may support external force as well as heat dissipation performance and insulation performance.

In addition, in the present invention, problems in which moisture or foreign substances are introduced into a motor according to inner air cooling to thereby cause an electrical short or fire may be solved together with a heat dissipation effect by insert-molding an insulating heat dissipation composite material having both heat dissipation performance and insulation performance so as to insulate spaces between wound coils while surrounding the coil wound around an insulator (or bobbin) of the stator. When insert-molded with the insulating heat dissipation composite material, the stator is formed to cover all portions exposed to the outside except the shoe portion of the stator core facing the magnet of the rotor.

Moreover, in the present invention, is to provide a rotor and a propeller driving device using same, the rotor may be provided by forming a plurality of through holes by connecting a rotor body with a rotary shaft through a plurality of bridges so as to achieve an inner air cooling together with a plurality of through holes formed in upper and lower covers.

In the present invention, heat dissipation performance may be maximized by varying the composition of a first insulating heat dissipation composite material used to form an insulator (or bobbin) insulating spaces between a stator core and a coil, and a second insulating heat dissipation composite material coated by an insert molding method so as to insulate the coil from the coil while surrounding the coil wound around the insulator (or bobbin).

BEST MODE

Figure 1:
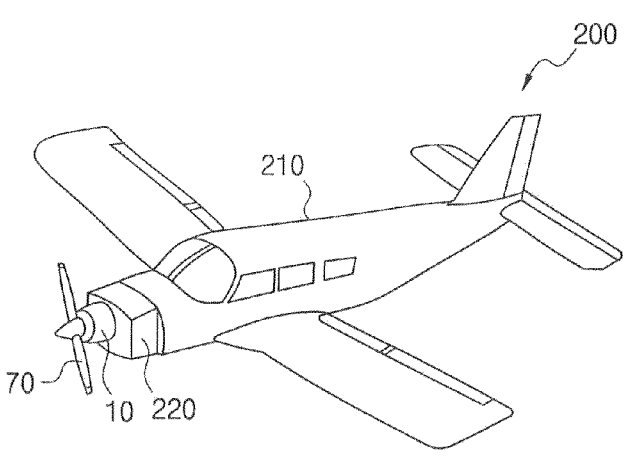
FIG. 1 is a perspective view showing a propeller light aircraft to which a propeller driving device according to the present invention is applied.

Hereinafter, embodiments of the present invention will be described in detail with reference to the accompanying drawings.

The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

The propeller driving device according to the present invention may be applied to, for example, a two-person light aircraft or a large drone carrying a heavy load, and a motor provided in the propeller driving device requires a large brushless direct-current (BLDC) driving motor of several tens of kilowatts (Kw) class.

When a large BLDC driving motor of several tens of Kw class used in the propeller driving device generates a lot of heat from a stator provided therein, the efficiency of the motor may decrease and failure may occur if proper cooling and heat dissipation are not performed.

Embodiments of the present invention will be described with respect to, for example, a propeller drive of a light aircraft employing an inner rotor-outer stator type BLDC motor having a stator that generates a lot of heat in which the stator is placed outside a rotor.

In the description of the embodiments, a rotary shaft of a propeller driving device is horizontally arranged, but may be applied even when arranged in the vertical direction. In this case, a reducer may be coupled to the output of the motor to increase torque.

Figure 2A:
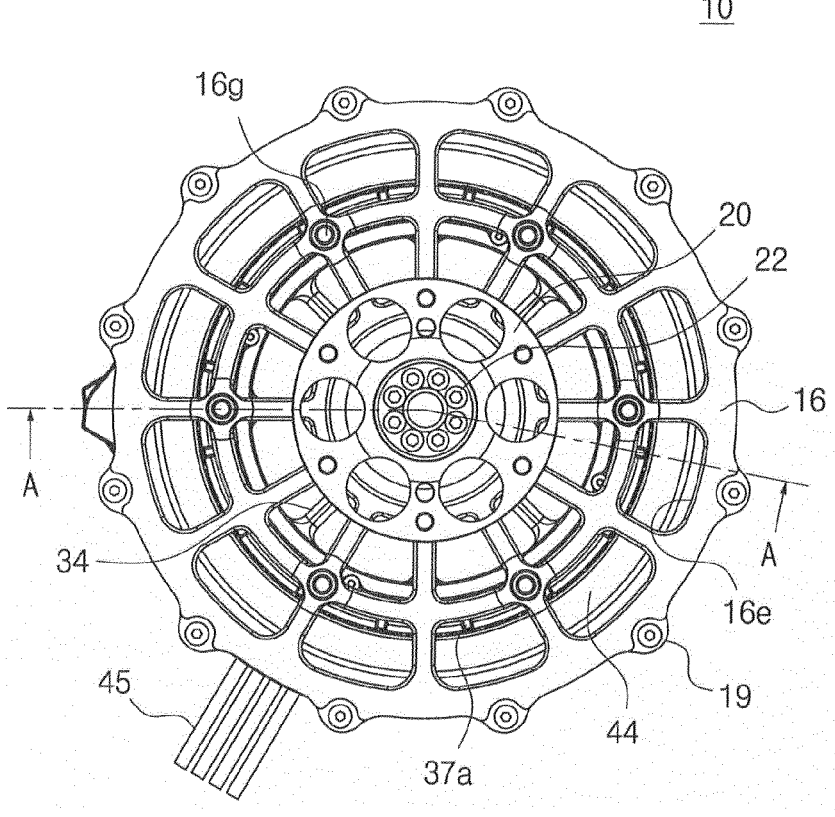
FIG. 2A is a plan view showing a propeller driving device according to the present invention and FIG. 2B is a cross-sectional view taken along line A-A of FIG. 2A.
Figure 2B:
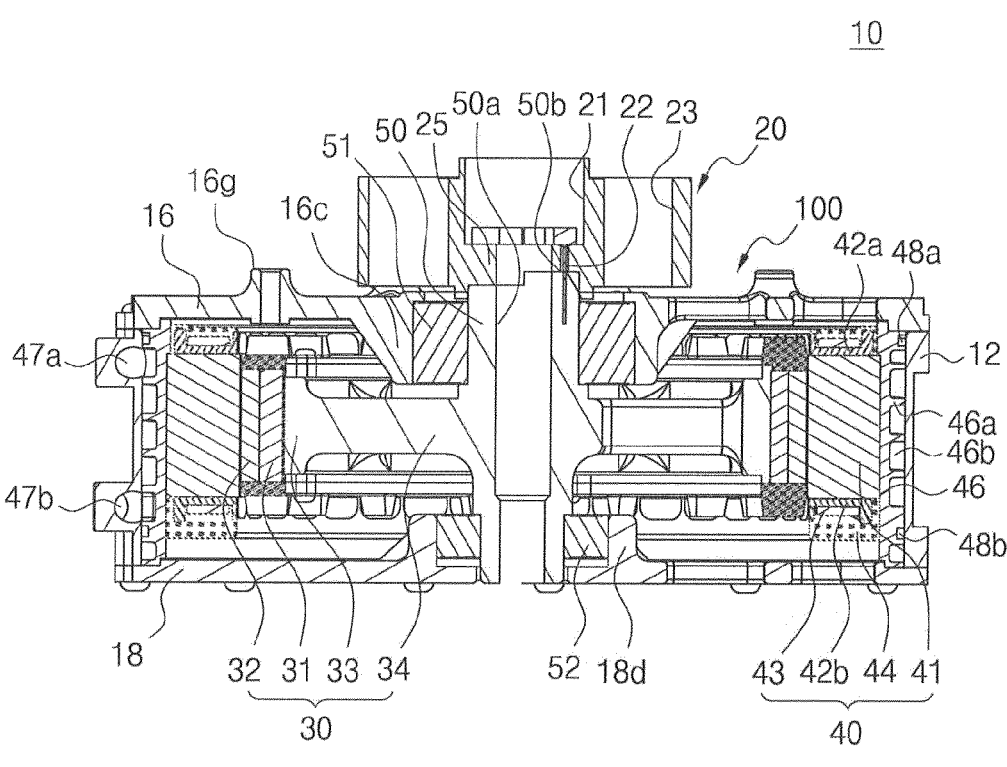

FIG. 1 is a perspective view showing a propeller light aircraft to which a propeller driving device according to the present invention is applied. FIG. 2A is a plan view showing a propeller driving device according to the present invention and FIG. 2B is a cross-sectional view taken along line A-A of FIG. 2A.

Referring to FIG. 1, a propeller driving device 10 according to the present invention is installed spaced apart from a front surface of a control box 220 placed at a front end of a fuselage 210 of a light aircraft 200, and a propeller 70 is coupled to a front end of a rotary shaft to rotate the propeller 70. The rotary shaft of the propeller driving device 10 is placed in the horizontal direction.

The control box 220 may include: a control unit for controlling various electronic devices for controlling the operation of the light aircraft 200; and a motor driving device for driving a BLDC motor 100 provided in the propeller driving device 10.

In this case, FIG. 1 shows a state in which a fuselage cover having an air suction hole formed on a lower side of the front end thereof is omitted while covering the propeller driving device 10 and the control box 220 between the propeller 70 and the fuselage 210.

In this case, the propeller driving device 10 according to the present invention is not limited to the light aircraft 200, but may be applied not only to multicopter-type drones that drive multiple propellers, but also to drones that drive a single propeller.

Figure 3:
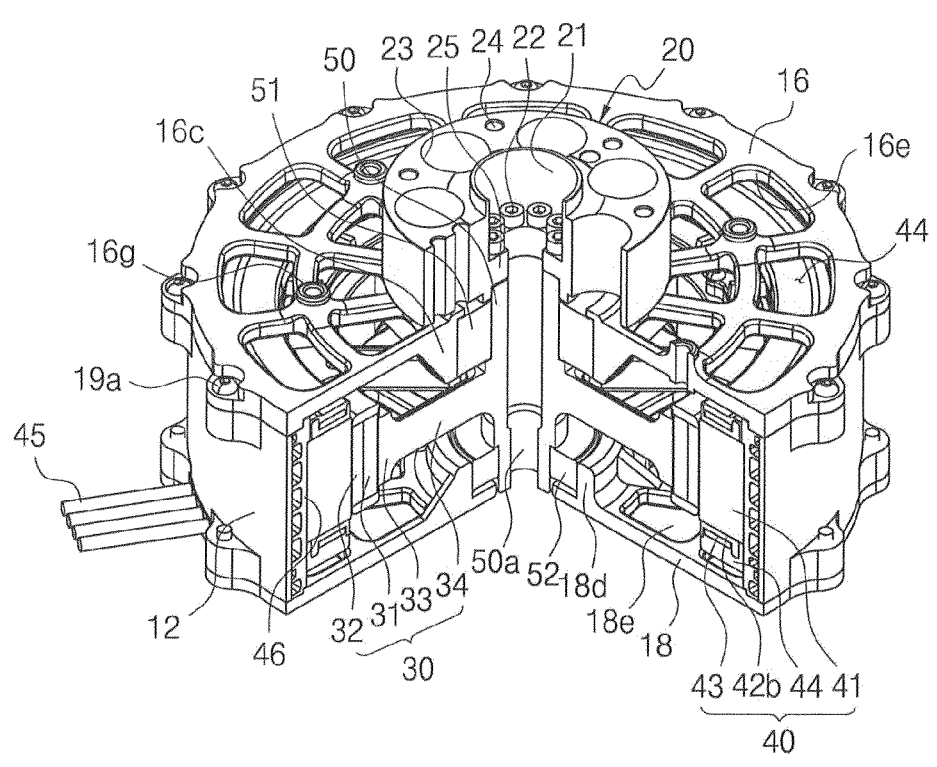
FIG. 3 is a partially cut-away perspective view of a propeller driving device according to the present invention.
Figure 4:
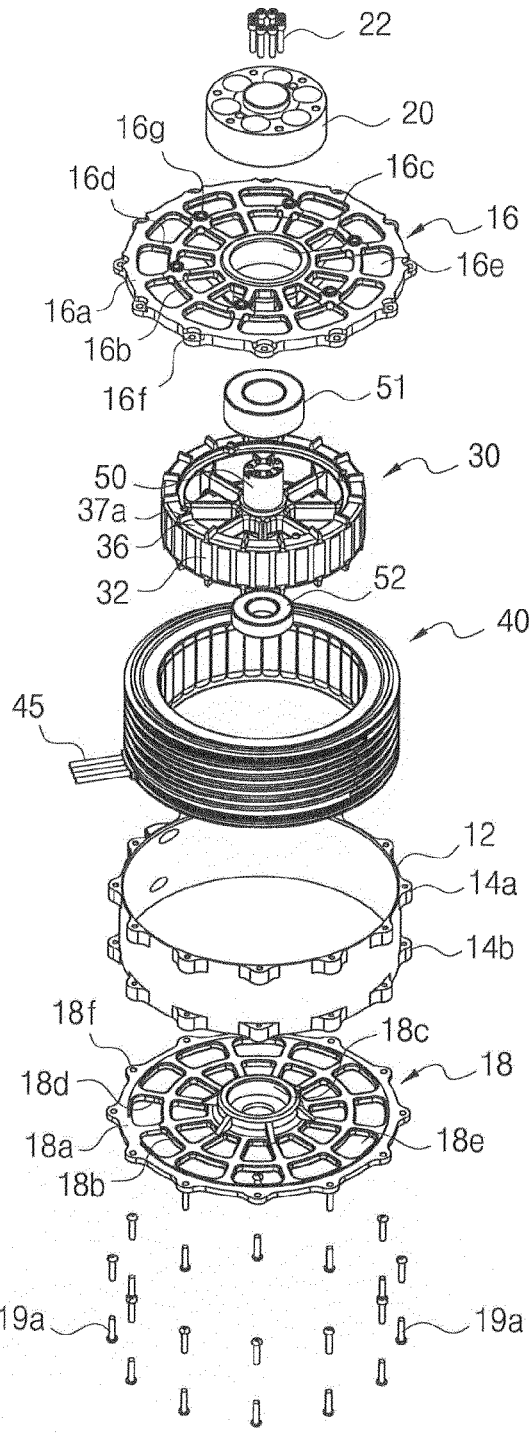
FIG. 4 is an exploded perspective view of a propeller driving device according to the present invention.
Figure 5:
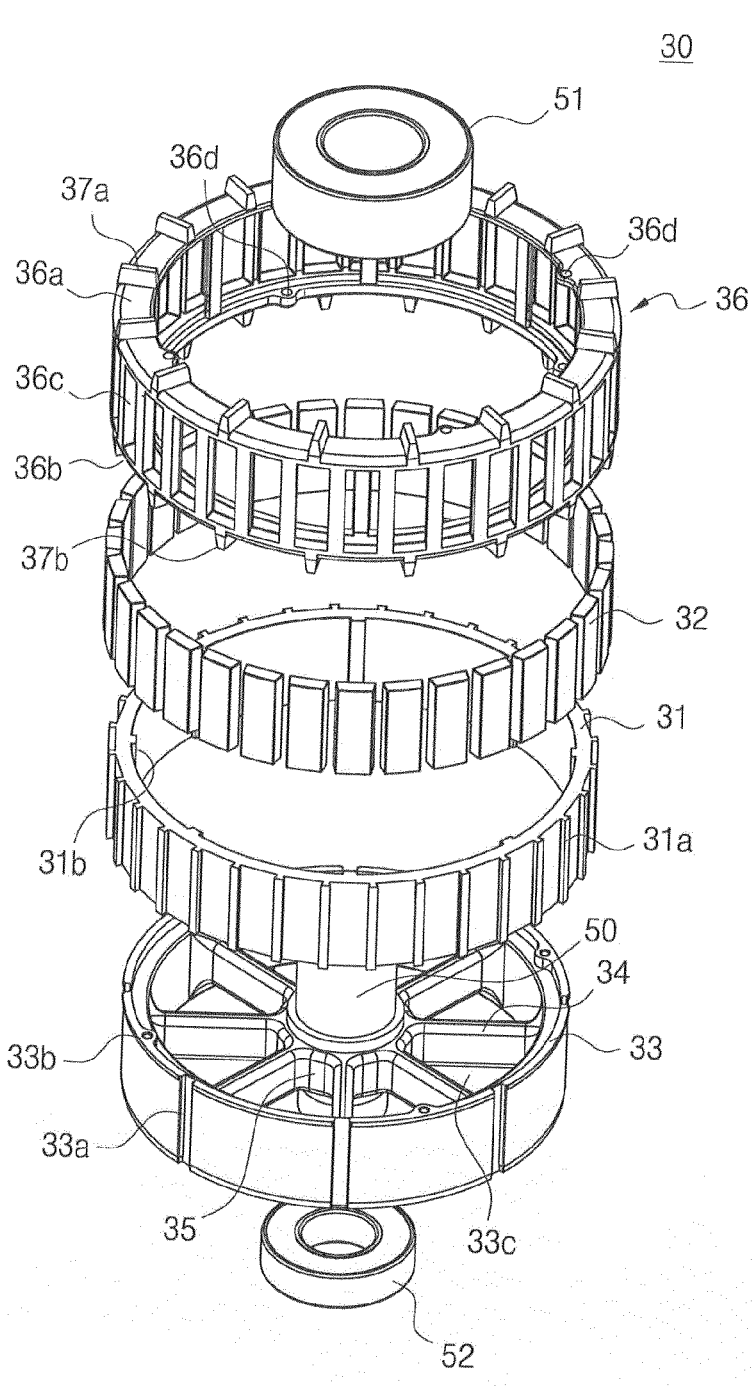
FIG. 5 is an exploded perspective view of a rotor of a propeller driving device according to the present invention.

Referring to FIGS. 2A to 3, the propeller driving device 10 according to the present invention may include a single rotor-single stator type motor 100 and a propeller installation bracket 20 for mounting the propeller 70 on the rotary shaft 50 of the motor 100.

In this case, the propeller installation bracket 20 is largely ring-shaped, and a large-diameter central through hole 21 is formed in a center portion of the propeller installation bracket 20. In addition, a plurality of large-diameter peripheral through holes 23 and a plurality of small-diameter peripheral through holes 24 are arranged on the same circumference as the central through hole 21 around the central through hole 21. The plurality of large-diameter peripheral through holes 23 and the plurality of small-diameter peripheral through holes 24 are arranged as a weight reduction purpose to reduce weight.

Since the propeller driving device 10 of the present invention, that is, the motor 100 adopts a large BLDC drive motor of several tens of Kw class, the rotary shaft 50 of the motor has a large diameter to have sufficient durability to transmit the strong rotational force of the rotor to the propeller 70, and the center of the rotary shaft is in the form of a hollow portion 50a for weight reduction. The outer diameter of the hollow portion 50a is configured to a size corresponding to the central through hole 21 of the propeller installation bracket 20.

An annular protrusion portion 25 is arranged on the lower side of the central through hole 21 of the propeller installation bracket 20 to be coupled to the rotary shaft 50 of the motor 100. In addition, the annular protrusion portion 25 has a plurality of screw fastening through holes for fastening and fixing a plurality of fixing screws 22 to the rotary shaft 50 of the motor 100.

An upper end portion 50b of the rotation shaft 50 is coupled, in a step structure, to a bottom surface of the annular protrusion portion 25 that is surface-bonded by receiving the upper end portion 50. The step structure coupling between the upper end portion 50b of the rotary shaft 50 and the bottom surface of the protruding portion 25 is to solve twisting generated when the propeller 70 is rotated.

The single rotor-single stator type motor 100 includes: a cylindrical case 12; and an upper cover 16 and a lower cover 18 respectively coupled to upper and lower portions of the cylindrical case 12. As a result, the cylindrical case 12, the upper cover 16, and the lower cover 18 serve as a housing of the motor 100.

A water jacket 46 for cooling the motor 100 by a water cooling method, a stator 40, a rotor 30, and a rotary shaft 50 are sequentially arranged inside the cylindrical case 12. The rotary shaft 50 is rotatably supported by an upper bearing 51 and a lower bearing 52 installed in upper and lower bearing housings 16c and 18c located at the centers of the upper cover 16 and the lower cover 18, respectively.

In this case, the upper bearing 51 may adopt, for example, a double-row angular ball bearing capable of supporting radial load and one large axial load at the same time, and the lower bearing 52 may adopt a single-row angular ball bearing.

Figure 6:
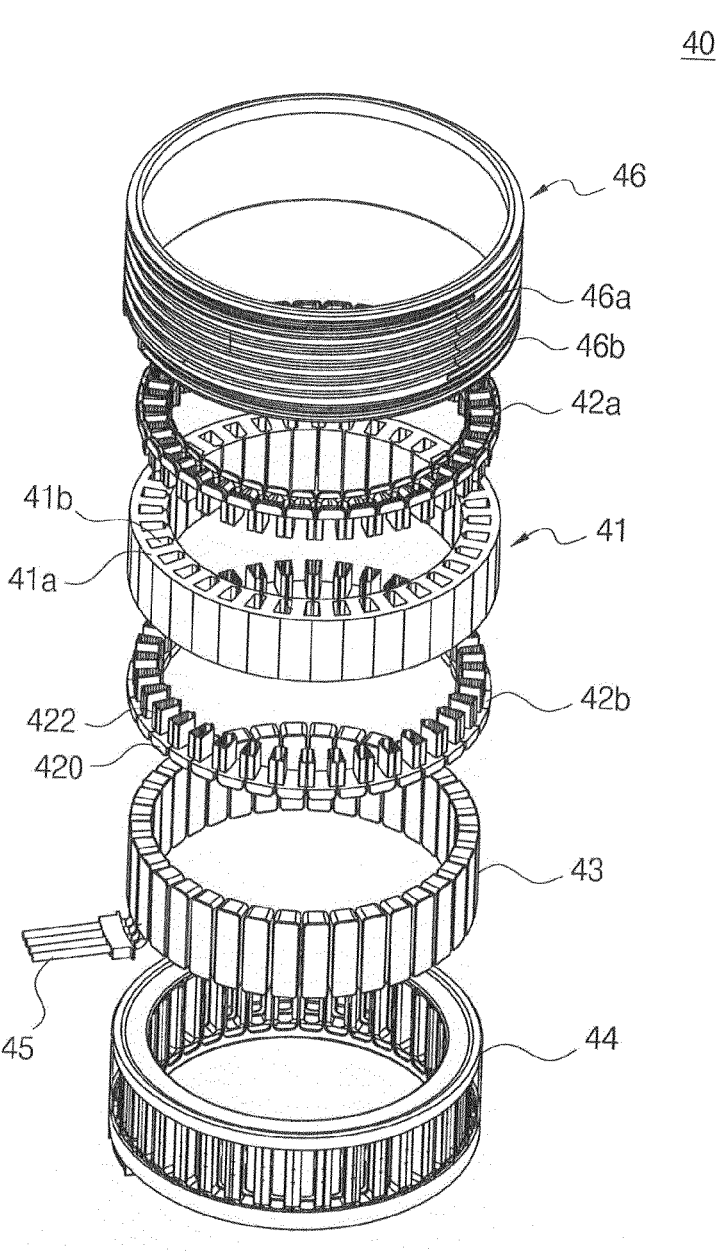
FIG. 6 is an exploded perspective view of a stator of a propeller driving device according to the present invention.

As illustrated in FIG. 6, the water jacket 46 has spiral protrusion portions 46a configured to form spiral passages on an outer periphery of the cylindrical body, and the spiral protrusion portions 46a are in contact with the inner side surface of the cylindrical case 12. As a result, spiral passages 46b through which refrigerant for cooling the motor 100 is circulated may be formed between the spiral protrusion portions 46a. In this case, the refrigerant may be water or an aircraft cooling oil.

In addition, as shown in FIG. 2B, an inlet 47a and an outlet 47b connected to the spiral passages 46b are respectively formed at the top and bottom of the cylindrical case 12, and the inlet and outlet 47a and 47b are connected to a pump (not shown) for circulating refrigerant.

O-rings 48a and 48b for sealing between the cylindrical case 12 and the upper and lower portions of the water jacket 46 are inserted, respectively, preventing leakage of the spiral passages 46b.

A plurality of protrusion portions each having a through hole 19 are provided in the upper cover 16 and the lower cover 18 for mutual coupling between the cylindrical case 12 and each of the upper cover 16 and the lower cover 18, and a fixing screw 19a is fastened and fixed to each of the plurality of through holes 19.

A plurality of through holes 16e and 18e serving as air flow passages for air cooling are formed in the upper cover 16 and the lower cover 18, respectively. To this end, the upper cover 16 and the lower cover 18 are provided with concentric intermediate rings 16b and 18b between upper and lower bearing housings 16c and 18c located inside thereof and acting as a hub and outer rings 16a and 18a located outside thereof, respectively. A plurality of bridges (16d, 18d) extend radially to connect the upper and lower bearing housings 16c and 18c, the intermediate rings 16b and 18b, and the outer rings 16a and 18a. Accordingly, a plurality of through holes 16e and 18e are formed among the upper and lower bearing housings 16c and 18c, the intermediate rings 16b and 18b, the outer rings 16a and 18a, and the plurality of bridges 16d and 18d.

The intermediate rings 16b and 18b may be omitted or added as necessary to reinforce strength, and a network structure for forming the plurality of through holes 16e and 18e formed in the upper cover 16 and the lower cover 18 may be changed variously differently.

The plurality of through holes 16e and 18e form an air flow passage for air cooling that introduces outer air at a relatively low temperature into the motor 100 from the outside, exchanges heat with the heat generated from the stator 40, and then discharges the exchanged heat to the outside of the motor.

The motor 100 according to the present invention has an inner rotor structure in which the rotor 30 is arranged inside the stator 40. In addition, the motor 100 constitutes a radial gap type motor in which the rotor 30 is concentrically arranged inside the stator 40.

As shown in FIGS. 2A to 5, the rotor 30 has a plurality of bridges 34 extending radially from a hollow rotary shaft 50 arranged in a central portion thereof, and a front end portion of each of the plurality of bridges 34 is connected to an annular rim 33. In addition, an annular hub 35 is reinforced to reinforce strength in the connection between each of the plurality of bridges 34 and the rotary shaft 50.

The annular rim 33 connected to the rotary shaft 50 through the plurality of bridges 34 is integrally formed, and may be made of a metal material capable of providing light weight and strength, for example, an aluminum alloy, duralumin, or the like.

A back yoke 31 serving as a magnetic circuit is coupled to the outer periphery of the annular rim 33 in a sliding manner. To this end, a plurality of coupling recesses 33a are formed on the outer periphery of the rim 33, and a plurality of coupling protrusions 31b coupled to the plurality of coupling recesses 33a protrude on the inner periphery of the back yoke 31.

The back yoke 31 may be made of an electrical steel sheet (silicon steel sheet) to form a magnetic circuit together with a plurality of magnets 32 attached to the outer surface thereof, and a plurality of coupling protrusions 31a for attaching the plurality of magnets 32 protrude from the outer surface thereof.

The plurality of coupling protrusions 31a of the back yoke 31 support the magnets 32 while accommodating the magnets 32 in a sliding coupling manner between two adjacent coupling protrusions 31a. In this case, the shape of each of the magnets 32 is trapezoidal, and the space formed between the two coupling protrusions 31a is formed with a longer inner width so that each of the trapezoidal magnet 32 is combined.

The plurality of magnets 32 are made of permanent magnets, and a plurality of N-pole and S-pole magnets are alternately arranged.

In the rotor 30, after the plurality of magnets 32 are attached to the outer surface of the back yoke 31, a rotor support 36 is coupled.

The rotor support 36 includes an annular upper plate 36a and an annular lower plate 36b covering the upper and lower portions of the magnets 32, and a plurality of connections 36c with both ends connected to an upper plate 36a and a lower plate 36b. Accordingly, the rotor support 36 covers the outer side surface of each magnet 32 except for the outer surface of each magnet 32 facing the shoe portion of the stator core.

A plurality of blades 37a and 37b protrude from the upper plate 36a and the lower plate 36b, respectively, to cool the stator 40 by generating wind when the rotor 30 is rotated. In this case, the plurality of blades 37a and 37b may have a linear shape, a round shape, or the like.

As described above, wind generated by the plurality of blades 37a and 37b according to the rotation of the rotor 30 follows the circumferential direction, and This circumferential wind collides with the air-cooling air flow passing through the plurality of through holes 16e of the upper cover 16, a plurality of spaces 33c between the plurality of bridges 34, and the plurality of through holes 18e formed in the lower cover 18 to generate vortex or eddy currents. The vortex generated in this way reaches the corners inside the motor 100, so that heat exchange with the stator 40, which generates the greatest heat, may be effectively performed.

In addition, the upper plate 36a and the lower plate 36b are provided with a plurality of protrusion portions each having a through hole 36d for coupling with the back yoke 31, and the back yoke 31 is provided with a plurality of coupling holes 33b so that the upper plate 36a and the lower plate 36b may be fastened with the back yoke 31 by means of fixing screws or the like.

The rotor 30 is connected between the rotary shaft 50 and the annular rim 33 through the plurality of bridges 34. As a result, the plurality of spaces 33c formed between the plurality of bridges 34 form an air flow passage for relatively low-temperature outer air introduced from the outside of the motor to the inside thereof to be discharged to the outside of the motor through the plurality of through holes 16*e* and 18*e* provided in the upper cover 16 and the lower cover 18.

As shown in FIGS. 2A to 4 and 6, the stator 40 includes: a stator core 41 having an annular back yoke 41*a* having a predetermined width to form a magnetic circuit and a plurality of teeth 41*b* extending radially inward from the back yoke 41*a*; insulators (or bobbins) 42*a* and 42*b* made of an insulating material integrally formed to surround an outer circumferential surface on which a coil of each of the teeth 41*b* is wound; a stator coil 43 wound on an outer circumferential surface of each of the insulators 42*a* and 42*b* of each of the plurality of teeth 41*b*.

Each of the plurality of teeth 41*b* has a "T" shape and has a winding region in which a coil 43 is wound between a shoe portion facing each of the magnets 32 of the rotor 30 and the annular back yoke 41*a*.

The insulators (or bobbins) 42*a* and 42*b* may be manufactured as upper and lower insulators 42*a* and 42*b* in advance, and then assembled to the stator core 41 or integrally formed with insulating plastic (resin) in an insert molding manner.

In this case, each of the upper and lower insulators 42*a* and 42*b* includes, in an annular base frame 420 having a predetermined width, a plurality of teeth receiving portions 422 configured to receive by ½ in the upper portion and the lower portion of the winding region of each of the teeth 41*b*, which protrude and are spaced apart from each other at intervals, except for the shoe portion facing each of the magnets 32 of the rotor 30.

The upper and lower insulators 42*a* and 42*b* may be formed of an insulating heat dissipation composite material having both heat dissipation performance and insulation performance. When the motor 100 is employed in an aircraft, the motor 100 is required to have at least 10 Kv of insulation performance so as to be safe from lightning, and the thermal conductivity of the motor 100 is preferably about 3 W/mK or more in consideration of heat dissipation characteristics.

Considering the above, the insulating heat dissipation composite material used in this invention includes a polymer matrix with a continuous use temperature of about 150° C. or higher and serving as a binder, an insulating heat dissipation filler made of ceramic added and dispersed to improve thermal conductivity, and a reinforcing fiber added to reinforce strength.

The polymer matrix may include one compound, a mixture of two or more thereof, or a copolymer thereof, selected from the group consisting of polyamide, polyester, polyketone, liquid crystal polymer, polyolefin, polyphenylene sulfide (PPS), polyether ether ketone (PEEK), polyphenylene oxide (PPO), polyethersulfone (PES), polyetherimide (PEI), and polyimide.

In this case, the polymer matrix may have a continuous use temperature of about 150° C. or higher, and, for example, may employ polyphenylene sulfide (PPS).

In addition, the insulating heat dissipation filler may be provided in an amount of about 75 to about 100 parts by weight based on about 100 parts by weight of the polymer matrix.

In addition, the insulating heat dissipation filler may include at least one selected from the group consisting of magnesium oxide, talc, titanium dioxide, aluminum nitride, silicon nitride, boron nitride, aluminum oxide, silica, zinc oxide, barium titanate, strontium titanate, beryllium oxide, silicon carbide, and manganese oxide.

An average particle diameter of the insulating heat dissipation filler may be approximately 10 nm to 600 μm.

Furthermore, the reinforcing fiber may be provided in an amount of about 30 parts by weight based on about 100 parts by weight of the polymer matrix, and for example, glass fibers and the like may be used.

In addition, the insulating composite material may further include at least one additive selected from the group consisting of a dispersant, an antioxidant, a work enhancer, a coupling agent, a stabilizer, a flame retardant, a pigment, and an impact modifier.

The inner rotor-outer stator BLDC motor 100 applied to the propeller driving device 10 according to embodiments of this invention includes a single rotor 30 and a single stator 40. The stator 40 has a three-phase (U, V, W) coil 43 wound around the teeth 41*b* of the stator core 41, and is connected through a cable 45 to apply a driving signal to the three-phase (U, V, W) coil 43 from a motor driving device installed outside the motor.

Figure 7:
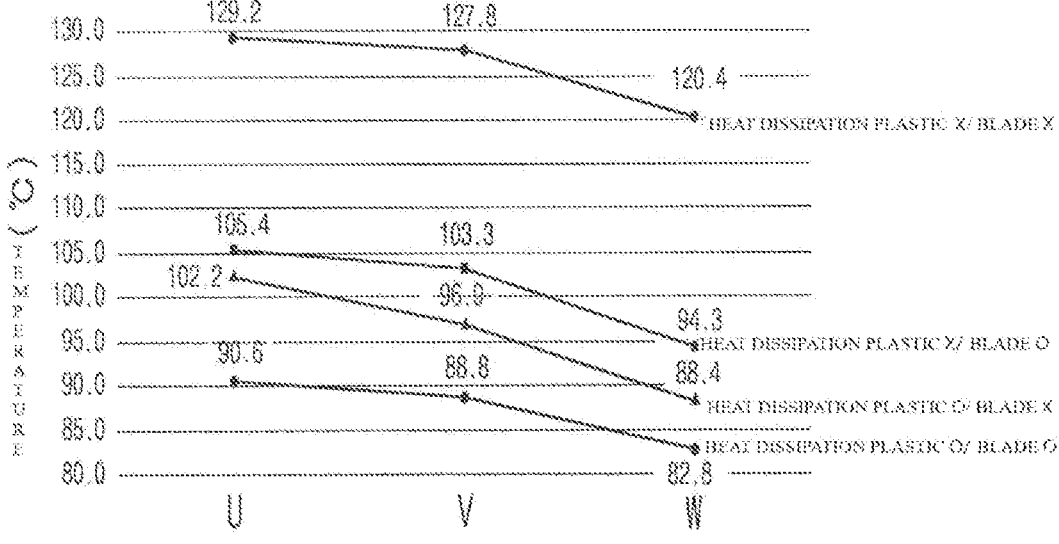
FIG. 7 is a graph showing temperature for each phase of U, V, and W of an embodiment in which an insulator (or a bobbin) is formed of an insulating heat dissipation composite material according to the present invention and a comparative example in which heat dissipation plastic is not applied.

FIG. 7 is a graph showing temperature for each phase of U, V, and W of an embodiment in which an insulator (or a bobbin) is formed of an insulating heat dissipation composite material according to the present invention and a comparative example in which heat dissipation plastic is not applied.

Moreover, in the present invention, an insulator (or a bobbin) is formed of an insulating heat dissipation composite material, to thereby provide an aviation motor capable of assuring mechanical strength such as tensile strength, flexural modulus, and the like which may support external force as well as heat dissipation performance and insulation performance.

In addition, in the present invention, a heat dissipation stator support 44 which is insert-molded with an insulating heat-dissipating composite material having both heat dissipation performance and insulation performance is included to surround the coil 43 wound around the insulators (or bobbins) 42*a* and 42*b* of the stator 40 and insulate spaces between the adjacent coils.

In this case, the stator support 44 that is insert-molded with the insulating heat dissipation composite material is formed to cover all parts exposed to the outside except for the shoe portion of the stator core 41 facing the magnets 32 of the rotor 30.

An outer side surface of the stator support 44 in a radial direction is in contact with the water jacket 46. Therefore, when heat is generated from the coil 43 of the stator 40, heat may be conducted to the stator support 44 for heat dissipation, and then heat dissipation may be achieved by exchanging the conducted heat with the water jacket 46, which is being cooled by water cooling.

As described above, in the propeller driving device 10 according to the present invention, an inner rotor-outer stator type BLDC motor 100 is used, and the rotor 30 and the stator 40 may be effectively cooled by outer air cooling and inner air cooling.

For the inner air cooling, in the present invention, the plurality of cooling through holes 16*e* and 18*e* are formed in the upper and lower covers 16 and 18 and simultaneously connected between the annular rim 33 supporting the main body of the rotor and the rotary shaft 50 through the plurality of bridges 34 to form the plurality of spaces 33*c* between the plurality of bridges 34, thereby forming an air flow passage through the inside of the motor.

That is, when an aircraft to which the propeller driving device 10 according to embodiments of the present invention is applied flies, outer air introduced from the outside to the inside through the plurality of through holes 16*e* provided in the upper cover 16 of the motor 100 passes through the plurality of spaces 33*c* formed between the plurality of bridges 34, and then is discharged to the outside of the motor through the plurality of through holes 18*e* provided in the lower cover 18.

As a result, relatively low-temperature outer air flows into the motor, to then be heat-exchanged with the heat generated by the stator 40, and then the heat exchanged air is discharged to the outside of the motor. Such an air flow may achieve inner air cooling of the motor.

Further, in the present invention, effective heat dissipation may be achieved in a water-cooling manner by having a water jacket 46 having a refrigerant circulation circuit capable of circulating a refrigerant between an outer circumferential portion of a stator core 41 and a casing 12.

In addition, in this invention, the insulators (or bobbins) 42*a* and 42*b* that insulate spaces between the stator core 41 and the coil 43 are formed of an insulating heat dissipation composite material with both heat dissipation performance and insulation performance, to thus achieve excellent heat dissipation performance and to thereby improve motor efficiency. In this case, insulators (or bobbins) 42*a* and 42*b* are formed of an insulating heat dissipation composite material, to thereby provide an aviation motor capable of assuring mechanical strength such as tensile strength, flexural modulus, and the like which may support external force as well as heat dissipation performance and insulation performance.

In the present invention, a heat dissipation stator support 44 which is insert-molded with an insulating heat-dissipating composite material having both heat dissipation performance and insulation performance is provided to surround the coil 43 wound around the insulators (or bobbins) 42*a* and 42*b* of the stator 40 and insulate spaces between the adjacent coils.

The heat dissipation stator support 44 covers all parts exposed to the outside except for the shoe portion of the stator core 41 facing the magnet 32 of the rotor 30. That is, waterproof molding is performed except for the shoe portion of the stator core 41 forming a magnetic circuit path together with the magnets 32 of the rotor.

As a result, no electrical short occurs even if moisture or foreign substances flow into the motor along the air flow passage passing through the inside of the motor described above.

In addition, the outer side surface of the heat dissipating stator support 44 in the radial direction may come into contact with the water jacket 46 that perform a cooling operation by water cooling so as to be heat-exchanged with the water jacket 46, to achieve heat dissipation.

In the embodiments according to the present invention, an example in which a propeller driving device rotationally drives a propeller of a light aircraft has been described, but the present invention may be applied to a drone in which a single propeller driving device is installed on a drone body or a multicopter-type drone is installed on a plurality of arms extending from the drone body.

Moreover, although it has been illustrated in the embodiment of the present invention that the rotary shaft of the motor rotationally drives the propeller of the light aircraft, which is exposed to the outside, the present invention may be changed to a drone having a fan structure in which a propeller or a blade is embedded in a cylindrical casing.

In addition, the present invention may be variously changed for various purposes, such as a logistics field, surveillance/reconnaissance/search, a disinfection/control/spray, broadcast/performance, an environmental measurement, a structure, and the like, in which a distribution box for delivery of parcel goods is detachably equipped at a lower portion of a drone body.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention relates to a propeller driving device which may effectively achieve heat dissipation by using a large BLDC motor of tens of Kw class of a single rotor-single stator method, by using a water jacket having a refrigerant circulation circuit for water cooling, while realizing an inner air cooling by using an air flow passage formed inside a motor, thereby being able to be applied to a light aircraft or a drone.

What is claimed is:

1. A propeller driving device comprising:
   a housing in which an upper cover and a lower cover having a plurality of through holes are respectively coupled to an upper portion and a lower portion of a cylindrical case;
   a stator arranged inside the case; a rotor arranged at a distance from the stator; and
   a rotary shaft connected to the rotor through a plurality of bridges and having both ends rotatably supported by an upper bearing and a lower bearing positioned at respective centers of the upper cover and the lower cover,
   further comprising a stator support having heat dissipation characteristics while surrounding a stator coil wound on the insulator while insulating spaces between adjacent coils, wherein the stator support is integrally formed by insert-molding an insulating heat dissipation composite material having heat dissipation performance and insulation performance,
   wherein inner cooling of a motor is formed by an air flow passage that passes through a plurality of through holes of the upper cover and the lower cover and a plurality of spaces formed between the plurality of bridges,
   wherein the stator comprises: a stator core having an annular back yoke having a predetermined width so as to form a magnetic circuit and a plurality of teeth extending from the back yoke in a central direction; an insulator formed to surround an outer circumferential surface on which a coil is wound in each of the plurality of teeth; and a stator coil wound around an outer circumferential surface of the insulator in each of the plurality of teeth, wherein the insulator is formed of an insulating heat dissipation composite material having both heat dissipation performance and insulation performance.

2. The propeller driving device of claim 1, wherein the rotor comprises: a hollow rotary shaft of which both ends are rotatably supported by the upper bearing and the lower bearing positioned at the center of the upper cover and the lower cover; a plurality of bridges extending radially from the rotary shaft; an annular rim connected to a front end of each of the plurality of bridges; an annular back yoke installed outside the rim to form a path of a magnetic circuit;

and a plurality of magnets which are installed on the outside of the back yoke and rotate according to a rotating magnetic field of the stator.

3. The propeller driving device of claim 1, further comprising a plurality of blades installed on the upper and lower portions of the rotor to generate circumferential wind when the rotor rotates, wherein the circumferential wind collides with an air flow of an air flow passage passing through the motor to generate a vortex.

4. The propeller driving device of claim 1, further comprising a water jacket having a spiral refrigerant circulation circuit placed between the cylindrical case and the stator and capable of refrigerant circulation between the case and the water jacket.

5. The propeller driving device of claim 1, further comprising a propeller installation bracket for mounting a propeller on the rotary shaft.

6. The propeller driving device of claim 5, wherein the propeller installation bracket has a ring shape with a central through hole formed in the central portion, the central through hole has an annular protrusion portion arranged on the lower side to be coupled to the rotary shaft of the motor, and an upper end portion of the rotary shaft and a bottom surface of the protrusion portion surface-bonded by receiving the upper end portion is coupled in a step structure in order to catch torsion during the rotation of the propeller.

7. The propeller driving device of claim 1, wherein the insulator comprises an upper insulator and a lower insulator which surround, by ½, the outer circumferential surface on which a coil is wound in each of the teeth, and each of the upper and lower insulators comprises: an annular base frame having a predetermined width; and a plurality of teeth receiving portions protruding from the base frame to receive, by ½, a winding area of each of the teeth from the upper and lower portions.

8. An aircraft comprising: a fuselage; a control box placed at a front end of the fuselage; and a propeller driving device according to claim 1 which drives a propeller installed at a distance from a front surface of the control box.

\* \* \* \* \*